United States Patent [19]

Ito et al.

[11] Patent Number: 5,235,845
[45] Date of Patent: Aug. 17, 1993

[54] METHOD OF DETECTING A PINHOLE AT A WELDED PORTION OF AN ARTICLE

[75] Inventors: Sentaro Ito, Niihama; Toshinori Shimizu, Kitasouma, both of Japan

[73] Assignee: Sumitomo Metal Mining Co., Ltd., Tokyo, Japan

[21] Appl. No.: 947,948

[22] Filed: Sep. 21, 1992

Related U.S. Application Data

[63] Continuation of Ser. No. 651,645, Feb. 6, 1991, abandoned.

[30] Foreign Application Priority Data

Feb. 6, 1990 [JP] Japan .................................. 2-25180

[51] Int. Cl.$^5$ .................................. G01M 3/02
[52] U.S. Cl. .................................. 73/40; 73/49.2; 73/49.8
[58] Field of Search .................... 73/49.8, 40, 49.2

[56] References Cited

U.S. PATENT DOCUMENTS

| | | | |
|---|---|---|---|
| 3,101,607 | 8/1963 | Taylor et al. | 73/40 |
| 3,524,342 | 8/1970 | Hobbs | 73/40 |
| 3,800,586 | 4/1974 | Delatorre et al. | 73/49.2 |
| 4,002,055 | 1/1977 | Kops | 73/40 |
| 4,294,107 | 10/1981 | Walle | 73/49.8 |
| 4,513,605 | 4/1985 | Hawerkamp | 73/40 |
| 4,683,745 | 8/1987 | Broughman, Jr. et al. | 73/40 |
| 4,715,214 | 12/1987 | Tveter et al. | 73/49.2 |
| 4,991,426 | 2/1991 | Evans | 73/40 |
| 5,042,289 | 8/1991 | Jensen | 73/40 |

FOREIGN PATENT DOCUMENTS

| 83131 | 3/1989 | Japan | 73/40 |
|---|---|---|---|
| 191863 | 3/1967 | U.S.S.R. | 73/40 |

*Primary Examiner*—Hezron E. Williams
*Assistant Examiner*—George M. Dombroske
*Attorney, Agent, or Firm*—Watson, Cole, Grindle & Watson

[57] ABSTRACT

Suction is applied to a pipe of an article. Then, the interior of the pipe is maintained under vacuum conditions for a period of several seconds. This is checked or monitored by a pressure switch. If the pressure in the pipe is raised from the predetermined level, then a pinhole is formed at a welded portion of the pipe to be examined.

13 Claims, 2 Drawing Sheets

METHOD OF DETECTING A PINHOLE AT A WELDED PORTION OF AN ARTICLE

This is a continuation of application Ser. No. 651,645 filed Feb. 6, 1991, now abandoned.

BACKGROUND OF THE INVENTION

1. Field of the Invention

The present invention relates to a method of detecting a pinhole at a portion where pipes are jointed together by welding.

2. Description of the Related Art

FIG. 2 is a schematic view of a test article before pipes 1 and connecting members 2 are welded together. FIG. 3 is a schematic view of the test article after the pipes 1 and connecting members 2 have been welded together. The test article is typically a frame for use in a television cathode-ray tube. The principle of a conventional method of detecting a pinhole at a welded portion of an article will be described with reference to FIG. 4. First, air 6 compressed under a pressure of between 1.5 and 2.0 Kgf/cm$^2$ is supplied both to the test pipe 1 and a leak-free master pipe 5 which is identical in shape to the test pipe 1 and has no pinholes. A pad 4 is attached to the test pipe 1 to surround an opening 3 (see FIG. 3). Two solenoid valves 7 and 8 are, thereafter, closed. Under the circumstances, if a pinhole is formed in the test pipe 1, then a slight change in pressure in the test pipe 1 takes place in several seconds. A differential pressure sensor 9 is then operable to sense the difference between the pressure in the test pipe 1 and the master pipe 5.

However, the pad 4 is subject to deformation when the pressurized air 6 is supplied. This causes leakage of air from the pad 4 and erroneously determines that there is a pinhole in the test pipe 1, regardless of the fact that no such pinhole is formed in the test pipe 1. Also, there may be a differential temperature between the test pipe 1 immediately after welded together and the master pipe 5. This differential temperature results in a corresponding differential pressure between the test pipe 1 and the master pipe 5. Consequently, a test result erroneously shows that there is a pinhole regardless of the fact that no such pinhole is formed in the test pipe 1. Appropriate measures should be taken to clean the pressurized air so as to inhibit oil mist or other foreign substances from entering into the pipes.

SUMMARY OF THE INVENTION

With the foregoing in mind, it is an object of the present invention to provide a method of detecting a pinhole at a welded portion of an article, which prevents erroneous test results that there is a pinhole, regardless of the fact that no such pinhole is formed in the welded portion of the article and which does not require any measures to prevent foreign substances from entering into pipes to be examined.

According to the present invention, there is provided a method of detecting a pinhole at a welded portion of an article, which comprises the steps of sucking air in a pipe of an article by means of a vacuum pump, and checking the pipe by means of a pressure switch to see whether the interior of the pipe is maintained under vacuum conditions so as to detect a pinhole in the welded portion.

Conventionally, pressurized air is supplied to a test pipe and a master pipe. Measurement is then taken to see whether there is a difference in pressure between the test pipe and the master pipe. Quite differently, in the present invention, suction is applied to the test pipe by the vacuum pump. Measurement is, then, taken to see whether the interior of the test pipe is maintained under vacuum conditions so as to detect a pinhole. When the suction is applied, a pad is forced toward the test pipe to prevent leakage of air from the test pipe through an opening. Temperature will not affect test results as the measurement is taken under vacuum conditions. This allows inspection of the pipes immediately after they are welded together. Also, the present method is advantageous in that no foreign substance enters into the pipes since no air under pressure is supplied to the pipes.

BRIEF DESCRIPTION OF THE DRAWINGS

A better understanding of the present invention may be had by reference to the following description of a preferred embodiment when taken in conjunction with the accompanying drawings, in which.

DESCRIPTION OF THE PREFERRED EMBODIMENT

Figure 1:
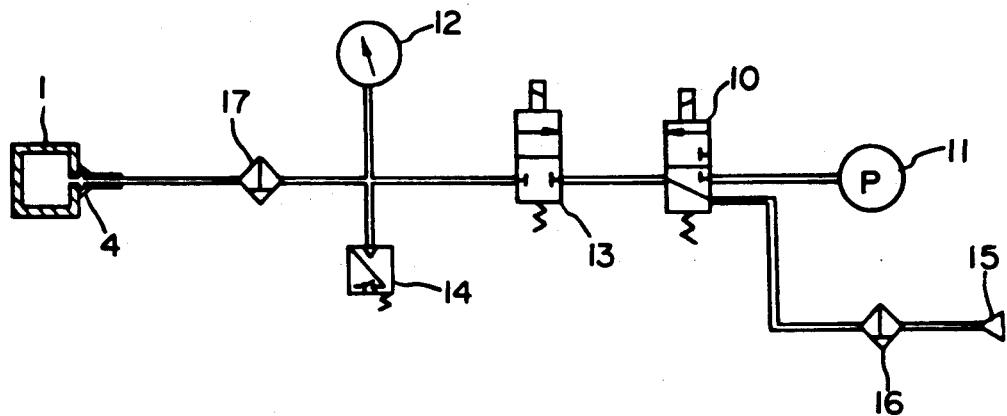
FIG. 1 illustrates how a pinhole is detected according to the principle of the present invention.
Figure 4:
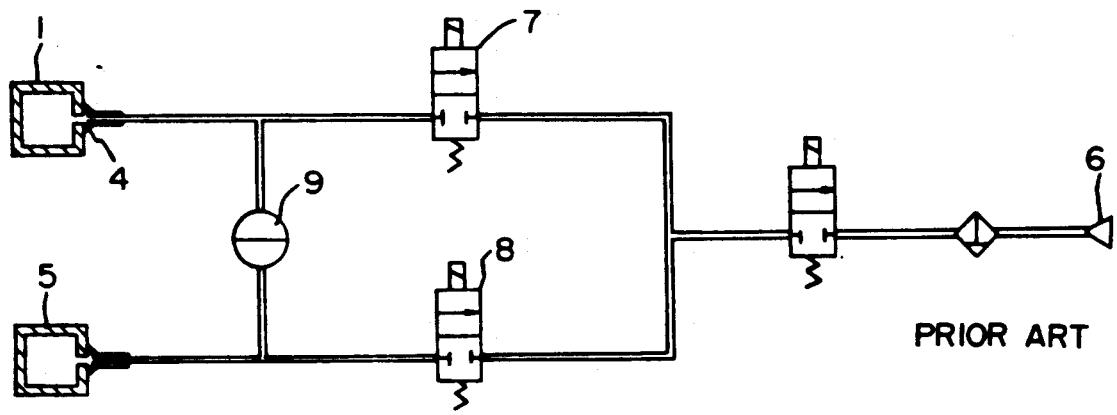
FIG. 4 illustrates how a pinhole is detected according to the principle of a conventional method.

The present invention will now be described by way of example with reference to the drawings. FIG. 1 illustrates how a pinhole is detected according to the principle of the present invention. A pad 4 is pressed against a pipe 1 in surrounding relation to an opening. A solenoid valve 10 is operated to drive a vacuum pump 11 so as to suck air in the pipe 1 until the pressure in the pipe 1 reaches a predetermined level near a vacuum level. This is monitored by a pressure gauge 12. Then, the solenoid valve 13 is closed so that the interior of the pipe 1, the pressure gauge 12 and a differential pressure switch 14 constitute a single closed container. The pressure gauge 12 is thereafter used to see whether such a predetermined level is maintained for a period of several seconds. If a pinhole is formed in the pipe 1, then air enters into the pipe 1 therethrough. As a result, the pressure in the pipe 1 is raised from the predetermined level. The pressure gauge 12 shows this change in pressure in the pipe 1, and the differential pressure switch 14 is rendered operative. This indicates that some pinhole is formed in the pipe 1. After the pinhole has been detected, the solenoid valve 13 is opened, and the solenoid valve 10 is operated to communicate the interior of the pipe 1 with an atmosphere. The pad 4 is, thereafter, removed from the pipe 1. Reference numerals 16 and 17 in FIG. 1 denote filters.

Figure 5:
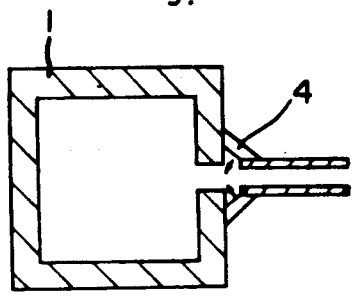
FIG. 5 is an enlarged view of a pipe and a pad pressed against the pipe.
Figure 2:
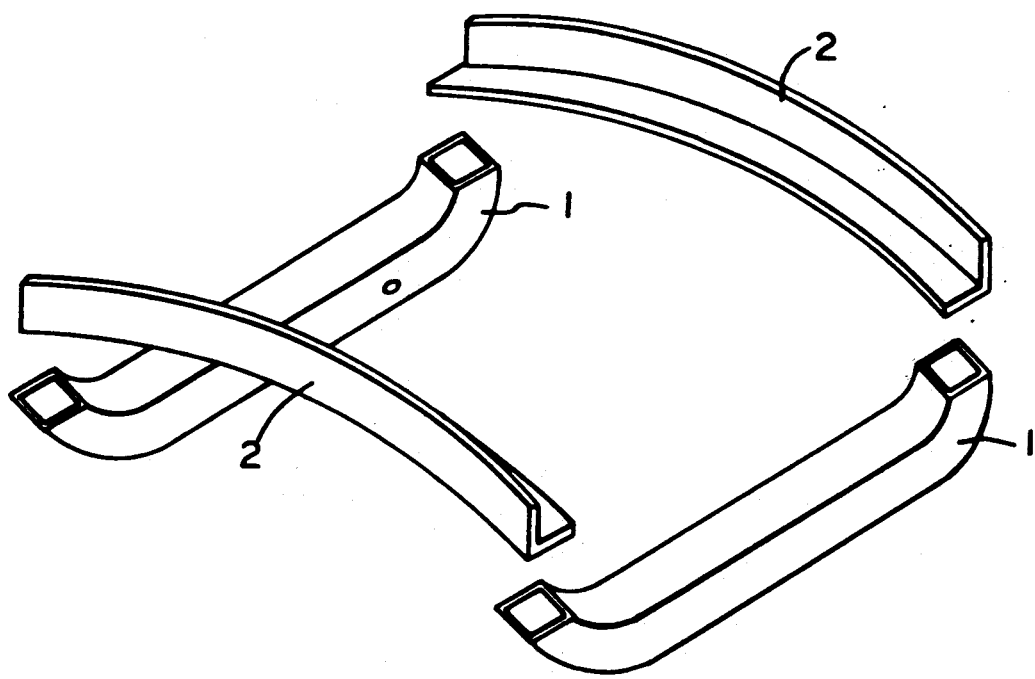
FIG. 2 is a schematic view of a test article before assembled together by welding.
Figure 3:
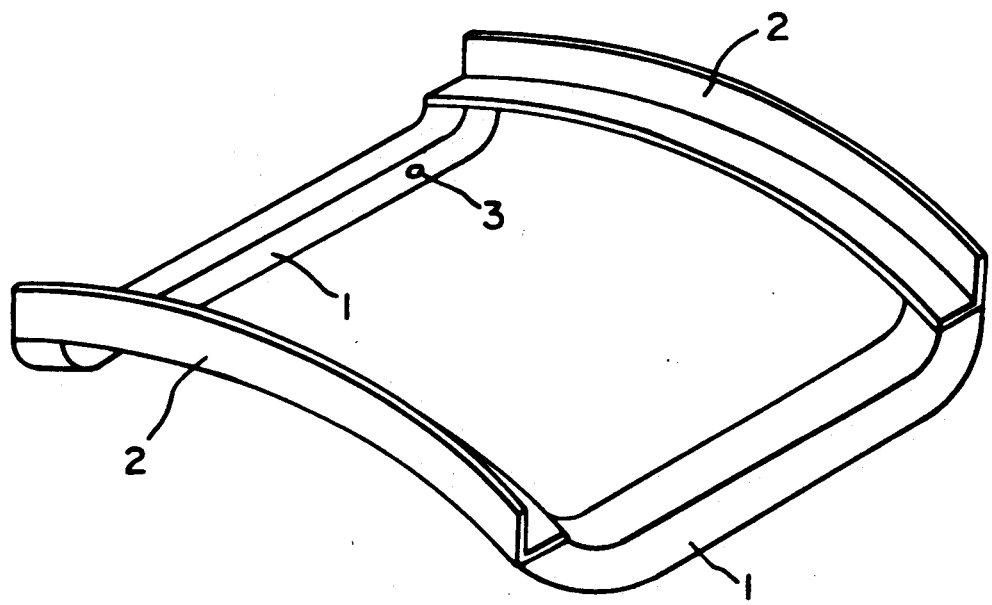
FIG. 3 is a schematic view of the test article after assembled together by welding.

FIG. 5 shows how the pad 4 is forced toward the pipe 1. Conventionally, the pad 4 is pressed against the pipe 1 to provide a seal therebetween. In the present invention, the pad 4 is not only pressed against, but also forced toward the pipe 1 under the influence of vacuum. This provides an improvement in the seal between the pad 4 and the pipe 1.

Illustratively, a seal is completely made between the pad and the pipe, and temperature will not affect test results as measurement is taken under vacuum conditions. The present method thus completely inhibits erroneous test results that there is a pinhole regardless of the fact that no such pinhole is formed, allows inspection of the pipe immediately after it is welded, and inhibits any foreign substance from entering into the interior of the pipe.

Table 1 shows the ratio between the total number of tests and the number of erroneous pipes tested in a one month test period results in the present invention and that in the prior art method discussed above. The erroneous test results were determined by a hot water immersion test wherein bubbles generated due to the expanding hot gases within the welded pipe indicate an air leak or pinhole. table 2 shows how soon a test can be initiated after the pipes are welded together.

TABLE 1

| | TOTAL NUMBER OF PIPES TESTED | ERRONEOUS TEST RESULTS | RATIO |
|---|---|---|---|
| PRESENT INVENTION | 7000 | 0/month | 0% |
| PRIOR ART | 6993 | 144/month | 2.06% |

TABLE 2

| | TIME UNTIL TEST CAN BE INITIATED AFTER WELD |
|---|---|
| PRESENT INVENTION | 2 to 3 seconds |
| PRIOR ART | at least 1200 seconds |

As stated above, the method of the present invention prevents erroneous test results and is highly reliable. No foreign substance will enter into the pipes under vacuum conditions. Particular measures are, thus, unnecessary to clean up air. Also, a test can be initiated sooner after the pipes are welded together than the prior art method.

While the present invention has been described with respect to a specific preferred embodiment, various changes and modifications may be made therein without departing from the spirit and scope of the invention.

What is claimed is:

1. A method of detecting the presence of a pinhole at a welded portion of an article, said article comprising a test pipe having a test hole, said method comprising the steps of:
    connecting a suction pipe directly to said test hole;
    providing a pad on a boundary portion between said suction pipe and said test hole;
    sucking air from inside said test pipe through said suction pipe which connects to a vacuum pump, thus forcing said pad under the influence of vacuum to move toward the test pipe and tightly contact said boundary portion, said pad forming a seal between the pad and the test pipe and preventing leakage of air through said test hole; and
    measuring near-vacuum conditions within said test pipe by means of a pressure switch to see whether the interior of said test pipe is maintained under near-vacuum conditions for a predetermined prior of time so as to detect a pinhole in the welded portion of said test pipe, said measuring being unaffected by the temperature of said air sucked from the inside of said test pipe.

2. The method of claim 1, wherein said predetermined period of time is not more than 2 to 3 seconds.

3. A method according to claim 1, wherein said method is performed immediately after said test pipe is welded.

4. A method of detecting a pinhole at a waded portion of an article having an internal volume and first and second openings to said internal volume, comprising the steps of:
    welding a closing member to said first opening to form said welded portion of said article;
    attaching a means to seal said second opening to a boundary portion between said second opening and a fluid communication means, thereby completely surrounding said second opening, said means to seal being in fluid communication with a vacuum pump through said fluid communication means and comprising a pad which is pressed against said boundary portion and forced toward said second opening when gases are sucked from said internal volume;
    sucking gases from said internal volume, through said means to seal, by said vacuum pump until a near vacuum level is reached and such that said means to seal is forced toward said second opening and tightly contacts said boundary portion and prevents leakage of air through said second opening;
    measuring the pressure within said internal volume to determine a first pressure at near vacuum conditions, then;
    measuring the pressure within said internal volume again after a period of time to determine a second pressure, said steps of measuring to determine a first pressure and measuring to determine a second pressure being unaffected by the temperature of the gases sucked from said internal volume; and
    comparing said first and second pressures to determine whether the interior volume is maintained under near vacuum conditions to detect whether a pinhole exists in the welded portion of said article, said method being substantially free of a cooling step between the steps of welding and sucking.

5. A method as in claim 4, wherein the steps of attaching a means to seal said second opening, sucking gases from said internal volume, and measuring the pressure within the internal volume to determine a first pressure are commenced within a period of 3 seconds after completion of said welding step.

6. A method as in claim 4, wherein said article contains a third opening and said welding step further includes welding a closing member to said third opening.

7. A method as in claim 4, wherein said means to seal said second opening completely seals the internal volume of said article, said method being free of using any additional means to seal.

8. A method according to claim 4, wherein said method is performed immediately after said article is welded.

9. A method of detecting a pinhole at a waded portion of an article having an internal volume and first and second openings to said internal volume, comprising of the steps of:
    welding a closing member to said first opening to form said welded portion of said article;
    attaching a means to seal said second opening to a boundary portion between said second opening and a fluid communication means, thereby completely surrounding said second opening, said means to seal being in fluid communication with a vacuum pump through said fluid communication means and comprising a pad which is pressed against said boundary portion and forced toward said second opening when gases are sucked from said internal volume;

sucking gases from said internal volume, through said means to seal, by said vacuum pump until a near volume level is reached and such that said means to seal is forced toward said second opening and tightly contacts said boundary portion and prevents leakage of air through said second opening;

measuring the pressure within said internal volume to determine a first pressure at near vacuum conditions, then;

measuring the pressure within said internal volume against after a period of time to determine a second pressure, said steps of measuring to determine a first pressure and measuring to determine a second pressure being unaffected by the temperature of the gases sucked form said internal volume; and comparing said first and second pressures to determine whether the interior volume is maintained under near vacuum conditions to detect whether a pinhole exists i the welded portion of said article, said method being substantially free of a cooling step between the steps of welding and sucking.

10. A method as in claim 9, wherein the step of attaching a means to seal said second opening, sucking gases from said internal volume, and measuring the pressure within the internal volume to determine a first pressure are commenced within a period of 3 seconds after completion of said welding step.

11. A method as in claim 9, wherein said article contains a third opening and said welding step further includes welding a closing member to said third opening.

12. A method as in claim 9, wherein said means to seal said second opening completely seals the internal volume of said article, said method being free of using any additional means to seal.

13. A method according to claim 9, wherein said method is performed immediately after said article is welded.

* * * * *